United States Patent [19]

Hilbrink et al.

[11] Patent Number: 5,754,126
[45] Date of Patent: May 19, 1998

[54] PALM MOUSE

[75] Inventors: Johan O. Hilbrink, Blue Ash, Ohio; Donald W. Carr, Birmingham, Mich.; Francis J. McFadden, Beavercreek, Ohio; Hans van Driest, Bilthoven, Netherlands

[73] Assignee: NCR Corporation, Dayton, Ohio

[21] Appl. No.: 746,182

[22] Filed: Nov. 6, 1996

Related U.S. Application Data

[63] Continuation of Ser. No. 355,448, Dec. 12, 1994, abandoned, which is a continuation of Ser. No. 11,023, Jan. 29, 1993, abandoned.

[51] Int. Cl.$^6$ ............................ H03M 11/00; H04B 10/00
[52] U.S. Cl. .......................... 341/20; 345/163; 345/158
[58] Field of Search ........................... 341/20; 345/163, 345/167, 158, 168, 212, 156, 164; 455/100, 125, 128

[56] References Cited

U.S. PATENT DOCUMENTS

| | | | |
|---|---|---|---|
| D. 292,224 | 10/1987 | Trumbull | D21/189 |
| D. 307,739 | 5/1990 | Grant | D13/168 |
| 4,550,250 | 10/1985 | Mueller et al. | 340/710 |
| 4,578,674 | 3/1986 | Baker et al. | 340/710 |
| 4,754,268 | 6/1988 | Mori | 340/710 |
| 4,862,165 | 8/1989 | Gart | 341/20 |
| 4,905,001 | 2/1990 | Penner | 341/20 |
| 4,927,987 | 5/1990 | Kirchgessner | 345/168 |
| 4,954,817 | 9/1990 | Levine | 340/706 |
| 5,122,654 | 6/1992 | Koh et al. | 340/710 |
| 5,287,090 | 2/1994 | Grant | 345/163 |

FOREIGN PATENT DOCUMENTS 9107826  5/1991  European Pat. Off. .

*Primary Examiner*—Glenton B. Burgess
*Attorney, Agent, or Firm*—Paul W. Martin

[57] ABSTRACT

A wireless pointing device which sits in the palm of a user's hand. The palm mouse includes a first portion which includes a ball for generating pointing signals, a control circuit for processing the pointing signals, a top section having a top surface which is generally ovoid in shape, and a bottom section having a bottom surface which is generally flat in shape and which contains an aperture through which the ball protrudes. A second portion includes a J-shaped flexible member attached to the first portion for cupping the hand. A communication circuit includes a transmitter within the first portion, a first antenna within the J-shaped member, a power supply within the first portion, a receiver coupled to the computer, and a second antenna coupled to the receiver. A preferred embodiment of the palm mouse has at least one switch on the J-shaped member, which is activated by the user's thumb.

16 Claims, 5 Drawing Sheets

FIG. 3
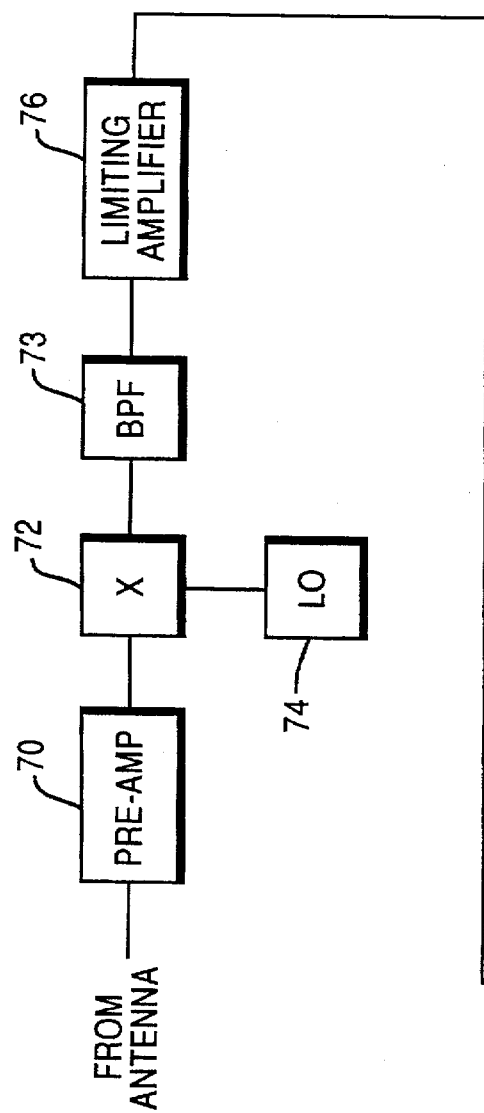
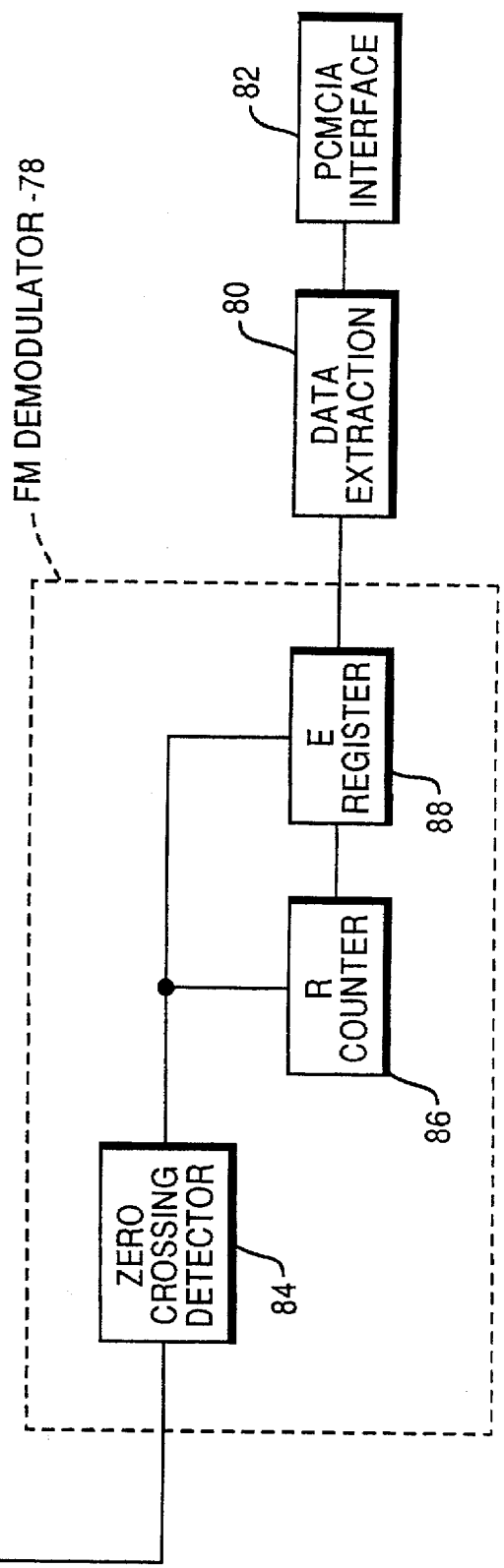

PALM MOUSE

This is a continuation of application Ser. No. 08/355,448 filed on Dec. 12, 1994, now abandoned. Which is a continuation of application Ser. No. 08/011,023 filed on Jan. 29, 1993, now abandoned.

CROSS REFERENCE TO RELATED APPLICATION

The present invention is related to commonly assigned U.S. Design Patent Application entitled "Palm Mouse or Similar Article", having an NCR docket number of D5653.

BACKGROUND OF THE INVENTION

The present invention relates to pointing devices for computer screens, and more specifically to a palm mouse.

Typical pointing or mouse devices incorporate a ball member which is directly manipulated with a thumb, or indirectly manipulated by moving the housing containing the ball. Disadvantageously, such devices typically require a minimum amount of valuable desktop or work space. Furthermore, in order to operate these devices, one must transfer a hand from the keyboard to the mouse device and back to the keyboard. This back-and-forth hand motion is a major disadvantage to using such devices. Experienced keyboard users find it more advantageous to learn and use key combinations for some tasks, instead of using the mouse.

Therefore, it would be desirable to provide a pointing device which is located in the hand of the user.

SUMMARY OF THE INVENTION

In accordance with the teachings of the present invention, a palm mouse is provided. The palm mouse includes a first portion which fits in the palm of a user's hand, a second portion which retains the first portion in the palm, and a circuit for wirelessly communicating with a computer.

The first portion includes a ball for generating pointing signals, a control circuit for processing the pointing signals, a top section having a top surface which is generally ovoid in shape, and a bottom section having a bottom surface which is generally flat in shape and which contains an aperture through which the ball protrudes.

The second portion includes a ring member sandwiched between the top and bottom sections and a J-shaped flexible member attached to the ring section for cupping the hand. The second portion is shaped to wrap around the back of a user's hand, between the thumb and first finger, in order to secure the mouse to the user's hand. The second portion is flexible enough to allow adjustment.

The communication circuit includes a transmitter within the first portion, a first antenna within the J-shaped member and coupled to the transmitter, a power supply within the first portion, a receiver coupled to the computer, and a second antenna coupled to the receiver.

A first embodiment of the palm mouse has at least one switch on the J-shaped member, which is activated by the user's thumb. A second embodiment employs at least one switch on the bottom surface of the bottom section of the first portion. Finally, a third embodiment employs a palm-activated switch on the top surface of the top section of the first portion.

It is accordingly an object of the present invention to provide a palm mouse.

It is another object of the present invention to provide a pointing device for a computer which is does not require desktop space.

It is another object of the present invention to provide a pointing device for a computer which is worn in the hand of a user, and which can be manipulated while the a user's hand is at the keyboard.

It is another object of the present invention to provide a pointing device for a computer which does not require hand motion away from a keyboard.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 3 is a block diagram of the receiver of FIG. 1;

DETAILED DESCRIPTION OF THE PREFERRED EMBODIMENT

Figure 1:
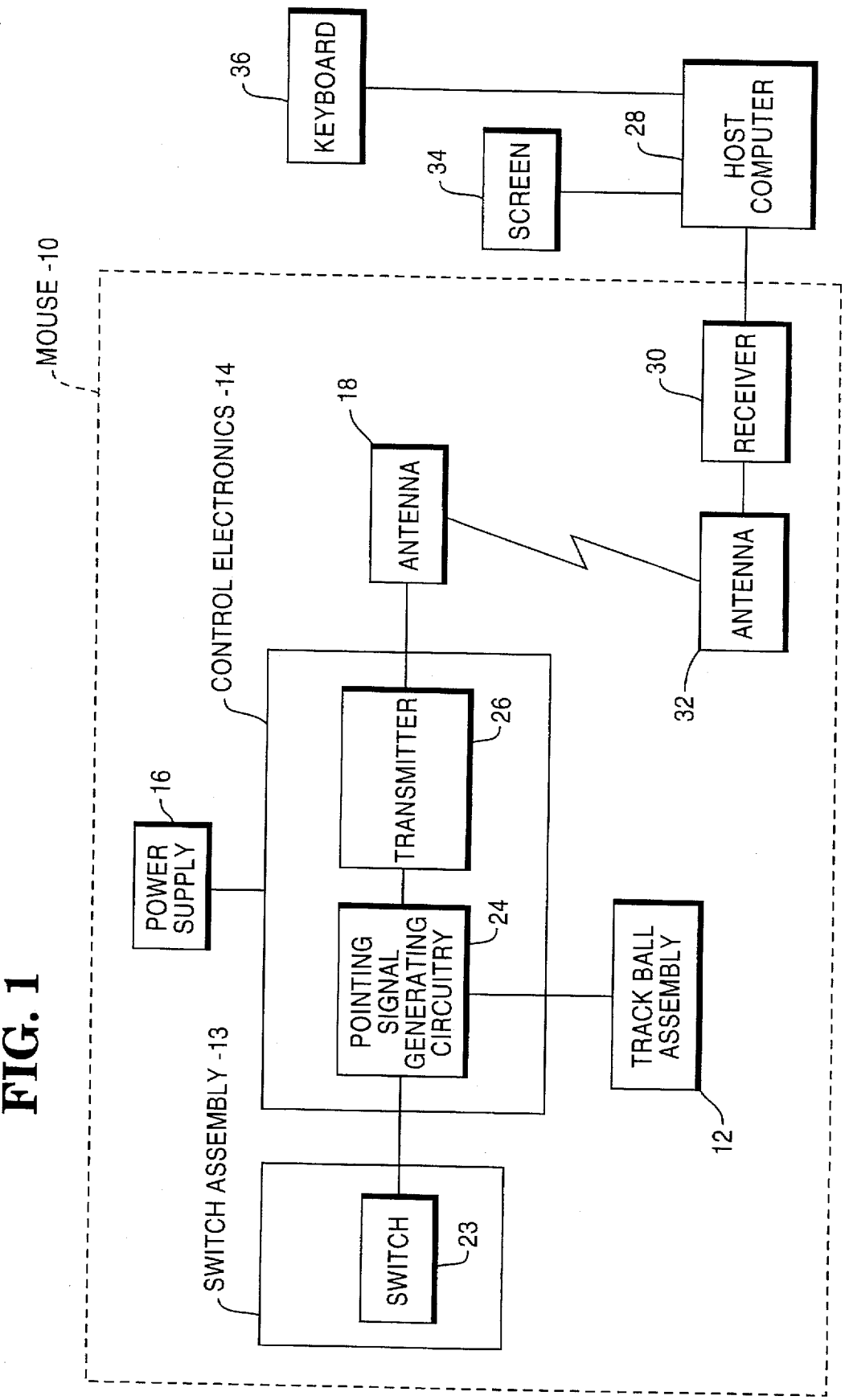
FIG. 1 is a block diagram of the palm mouse circuit of the present invention.

Referring now to FIG. 1, palm mouse 10 includes track ball assembly 12, mouse switch assembly 13, control electronics 14, power supply 16, and antenna 18.

Figure 4:
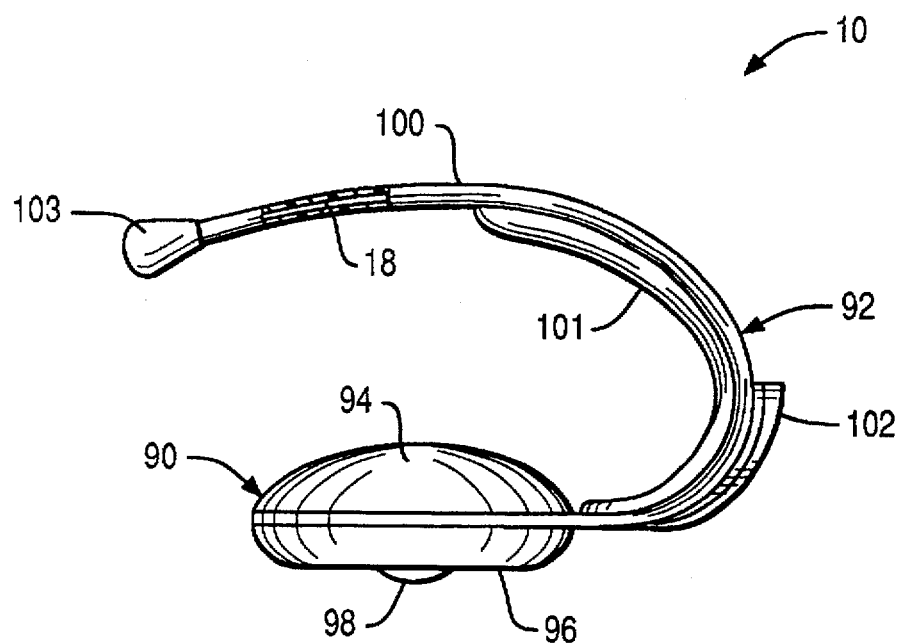
FIG. 4 is a side view of a first embodiment of the palm mouse of the present invention
Figure 7:
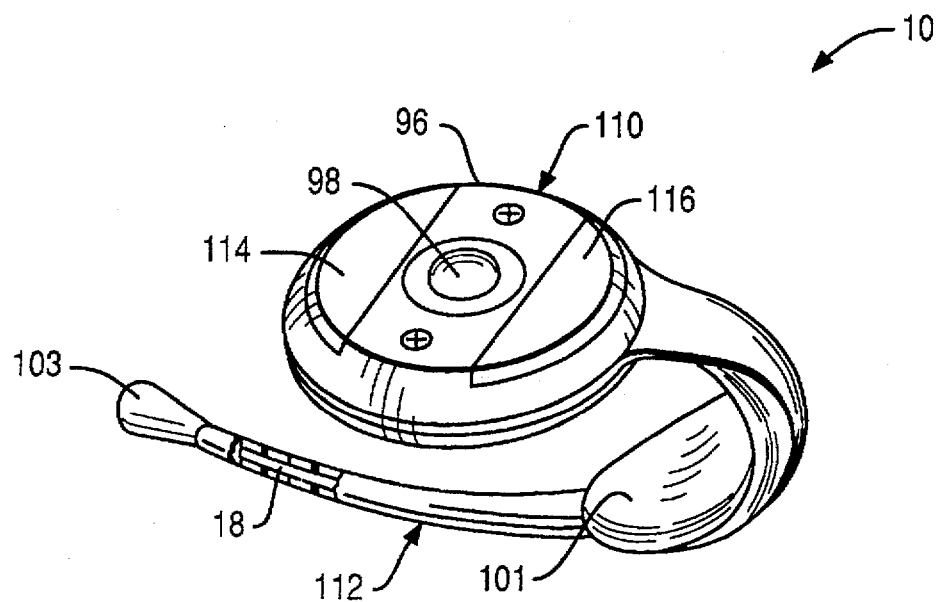
FIG. 7 is a perspective view of a third embodiment of the palm mouse of the present invention.

Track ball assembly 12 includes a track ball 98; FIGS. 4 and 7 and hardware for sensing trackball movement.

Mouse switch assembly 13 includes at least one switch 23 for point and click or drag and drop user-initiated actions. In the preferred embodiment, switch 23 is operated by a thumb. In other embodiments, switch 23 is activated by a finger or the palm of a hand.

Control electronics 14 includes circuitry 24 for generating pointing signals in response to trackball and switch movement. Control electronics 14 also includes transmitter 26, for transmitting pointing signals to host computer 28 through receiver 30 and host computer antenna 32. Receiver 30 is preferably a PCMCIA format receiver. Since a pointing device is typically part of a feedback loop, control electronics 14 may also include a receiver as well as a transmitter. However the preferred embodiment employs a CRC code to ensure that data corruption does not occur, thereby eliminating the need for a receiver in mouse 10.

Transmitter 26 and receiver 30 preferably operate at gigahertz frequencies, preferably 2.4 GHz or above, although other frequencies, such as infrared, are also envisioned by the present invention. Use of gigahertz frequencies provides the advantage of being able to use a small antenna 18. To limit power consumption, transmitter 26 receives power from power supply 16 only when necessary to transmit. Frequency shift keying is also employed to modulate the transmitted signal.

Power supply 16 provides power for operating control electronics 14. Power supply 16 preferably includes a battery.

Antenna 18 is coupled to transceiver 26 of control electronics 14.

Screen 34 and keyboard 36 are coupled to host computer 28.

Figure 2:
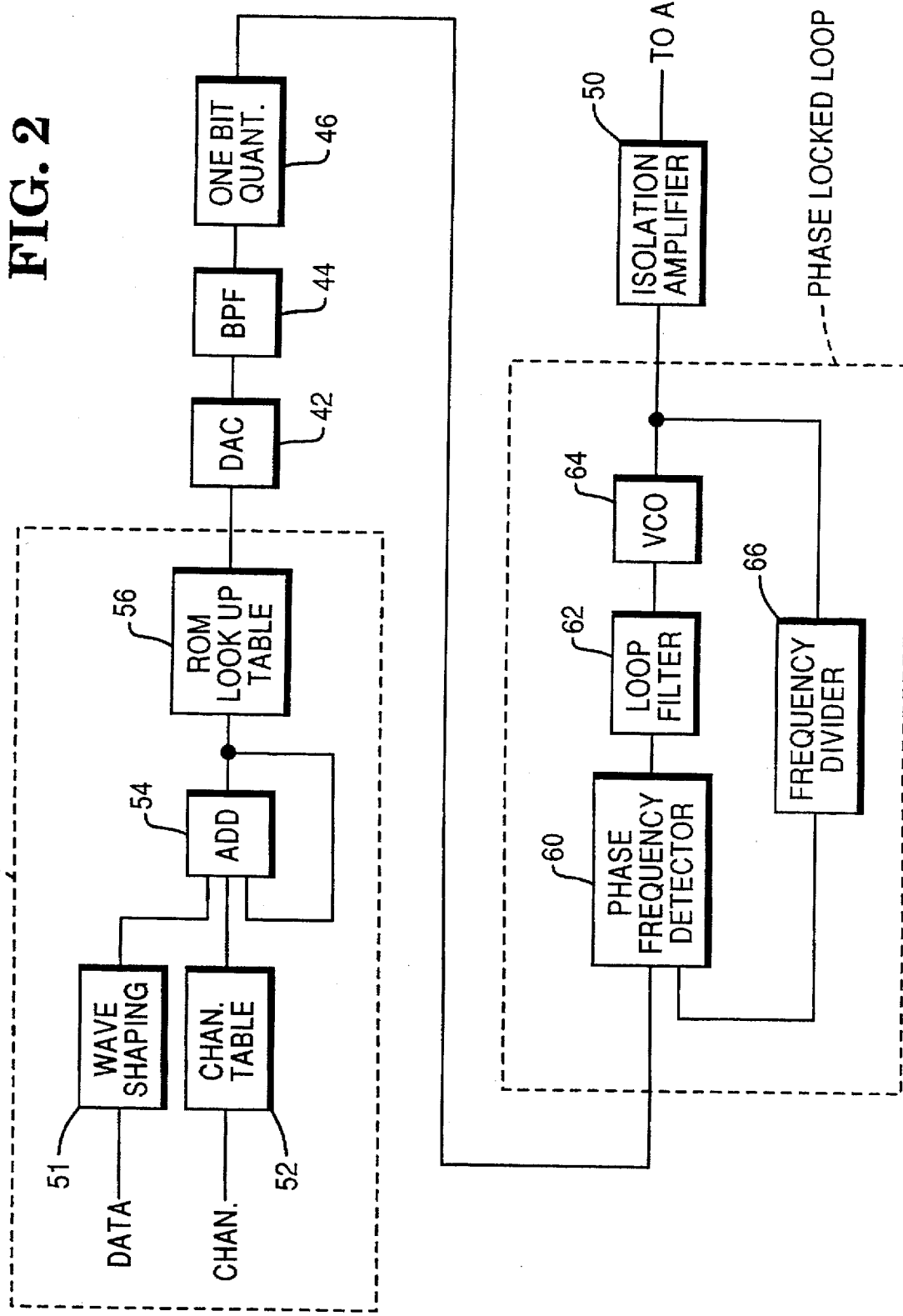
FIG. 2 is a block diagram of the transmitter of FIG. 1.

Turning now to FIG. 2, transmitter 26 preferably includes direct synthesizer 40, digital-to-analog converter (DAC) 42, bandpass filter 44, one-bit quantizer 46, phase-locked loop (PLL) circuit 48, isolation amplifier 50, and power management circuit. Direct synthesizer 40 generates a reference frequency which is high enough to provide a high loop bandwidth in PLL circuit 48.

Direct synthesizer 40 includes wave-shaping circuitry 51, channel selection circuitry 52, adder 54, and ROM lookup table 56.

Wave-shaping circuitry 51 compensates for distortion caused by filters within transmitter 26 and receiver 30.

Channel selection circuitry 52 includes a table which translates an increment value corresponding to a predetermined channel frequency to a channel number.

Adder 54 generates an address for lookup table 56 by adding a step value to the previous adder output value. In practice, the output address of adder 54 is the modulo of the maximum address value. The step value contains a part which sets the channel at which the mouse is to operate, and a data part, different for a logic one or zero.

Look up table 56 contains a single sine wave (but in practice only 90 degrees of a sine wave) of infinite period, which is incremented by the step value. The output frequency of lookup table 56 depends upon the operating (clock) frequency, the length of lookup table 56, and the step value. Thus, a single crystal oscillator can be used as a reference to obtain a very large number of output frequencies, which are a precise fraction of the frequency of the crystal oscillator.

To reduce both the length of lookup table 56 (cost) and the clock rate (power), the sample clock is set only slightly higher than the output frequency (12 MHz). If direct synthesizer 40 is set to generate 2.5 MHz, the sample frequency minus 2.5 MHz will also be generated (9.5 MHz). When the 2.5 MHz component and all higher frequency components (the first at 12+2.5=14.5 MHz) are filtered away by bandpass filter 44, a sine wave having a frequency of 9.5 MHz remains.

In two-level frequency shift keying, two discrete frequencies are used to represent a logical one and a logical zero. The difference between these frequencies determines the resolution needed for direct synthesizer 40. If the difference between the two frequencies (representing a logical one and a logical zero) is set at 93.75 KHz, direct synthesizer 40 needs a resolution of 93.75e3/256 (256 being the transformation factor of the PLL), which is 366.21 Hz. Such resolution, with an input clock rate of 12 MHz, would require a table length of 32768 bytes. Even when considering that only 90 degrees have to be stored in table 56, this is still rather long (resulting in a high gate count). If wave shaping is to be performed, the resolution has to be even higher.

A simple way to reduce the length of the ROM table is to create intermediate frequencies by changing frequency for one sample once in a number of samples. In practice this means that the step value of direct synthesizer 40 is changed every so many samples (say one out of eight, giving a change of ⅛ the other step value would give when applied constantly). When increasing the frequency resolution in this way, a number of spurious frequency components will be generated, but as long as these are suppressed by bandpass filter 44, and by the loop filter of PLL circuit 48, this is not a problem.

DAC 42 converts the digital output frequency from direct synthesizer 40 to an analog signal.

Bandpass filter 44 filters out undesirable frequencies.

One-bit quantizer 46 is a fest comparator which provides a stable reference signal to PLL circuit 48.

PLL circuit 48 preferably includes phase frequency detector 60, loop filter 62, voltage-controlled oscillator (VCO) 64, and frequency divider 66. PLL circuit 48 acts a frequency transformer. Since VCO signal is divided by a factor N, the loop is locked when VCO 64 runs at exactly N times the input frequency. Every change on the frequency or phase of the input signal will appear N times at the output. A preferred value for N is 256.

PLL circuit 48 operates quickly so as to limit power consumption but maximize data rate. Also, PLL circuit 48 locks last after transmitter power is turned on. Furthermore the bandwidth of the PLL is a practical limitation to the data rate of the transmitter, because modulation takes place before the PLL. Phase frequency detector 60 is employed because it is a fast type of phase detector, and because it produces only very short spikes once locked, thereby reducing the ripple energy on the output of loop filter 62.

Loop filter 62 is a second order loop filter, which also helps to speed up the response of PLL circuit 48. VCO 64 may be any commercially-available design.

Divider 66 may also be any commercially-available design. To implement a 256-divider at 2.5 GHz, a 128-divider and a divide-by-2 divider may be employed.

Isolation amplifier 50 minimizes disturbance from external sources. VCO 64 is sensitive to such disturbances. Since antenna 18 is connected directly to VCO 64, pulling is likely without such an amplifier.

To minimize power consumption, transmitter 26 is shut off as often as possible. Transmitter power management circuit 53 runs at a low cLock rate, drawing close to zero power.

Referring now to FIG. 3, receiver 30 includes pre-amplifier 70, mixer 72, bandpass filter 73, local oscillator 74, limiting amplifier 76, demodulator 78, data extraction circuit 80, and PCMCIA interface 82.

Pre-amplifier 70 is not intended to add gain to the signal path, but to isolate the antenna from local oscillator 74.

Mixer 72 and local oscillator 74 convert the 2.4 GHz input signal to a signal around 200 KHz.

Bandpass filter 73 filters the 200 KHz signal to suppress out-of-band signals. It sets the noise bandwidth and determines the selectivity of receiver 30.

Limiting amplifier 76 provides almost all of the gain of receiver 30.

Demodulator 78 is preferably a digital FM demodulator and includes zero-crossing detector 84, counter 86, and register 88. Zero-crossing detector 84 delivers a pulse, with a duration of one sample, for every zero crossing. This pulse is used to reset counter 86 running at a frequency considerably higher than the input frequency (in this case the clock is around 30 MHz). Counter 86 counts the number of clocks between two zero-crossings. Register 88 stores the output from counter 86 just before it is reset to zero. Advantageously, demodulator "locks" very fast to conserve power while providing a large input frequency range.

Data extraction circuit 80 extracts pointing information data from demodulator 78.

Finally, PCMCIA interface 82 provides a standard interface between palm mouse 10 and host computer 28.

Figure 5:
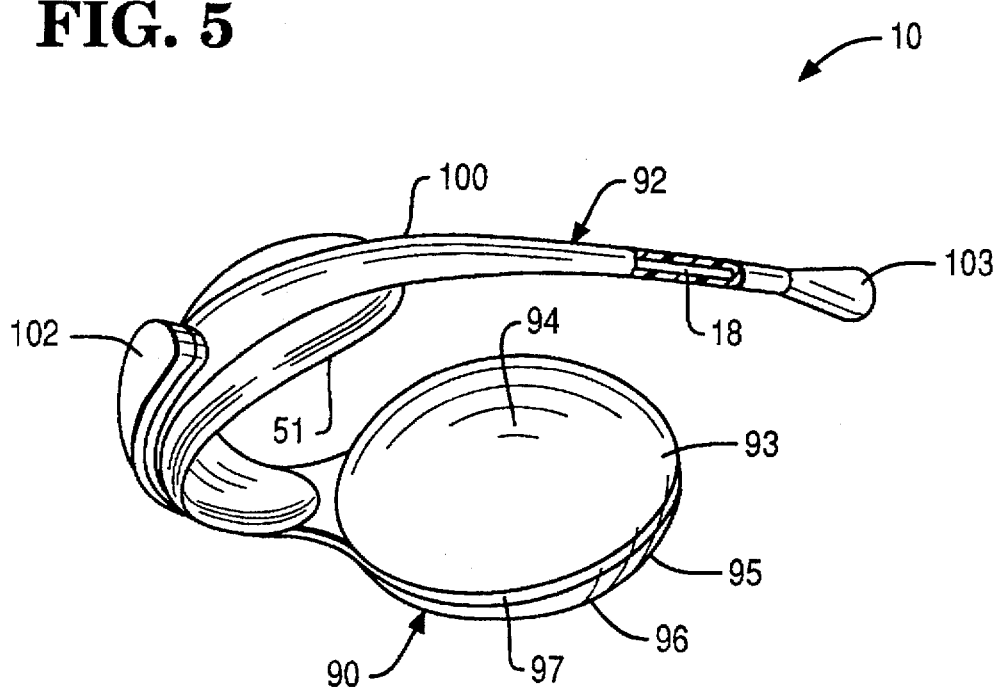
FIG. 5 is a perspective view of the palm mouse of FIG. 4.

Turning now to FIGS. 4 and 5, a first embodiment of palm mouse 10 is shown. Mouse 10 includes body portion 90 and antenna portion 92. Body portion 90 is ergonomically designed to fit comfortably in a user's palm. Body portion 90 includes upper and lower half sections 93 and 95. Top surface 94 is generally convex, while bottom surface 96 is generally flat. Track ball 98 protrudes through bottom surface 96.

Antenna portion 92 includes a ring section 97 which is sandwiched between sections 93 and 95 so as to attach antenna portion 92 to one end of body portion 90. Antenna portion 92 is shaped to wrap around the back of a user's hand, between the thumb and first finger, in order to secure mouse 10 to the user's hand. Antenna portion 92 is flexible enough to allow adjustment. Antenna portion 92 also includes antenna 18, protective shell 100, saddle 101, thumb actuator 102, and end cap 103. Saddle 101 is preferably made of soft rubber and is ergonomically shaped to form a secure and comfortable bridge between the user's hand and antenna portion 92. End cap 103 provides a blunt protective surface. Antenna portion 92 also includes switch 23 (not shown), which is actuated by thumb actuator 102.

Figure 6:
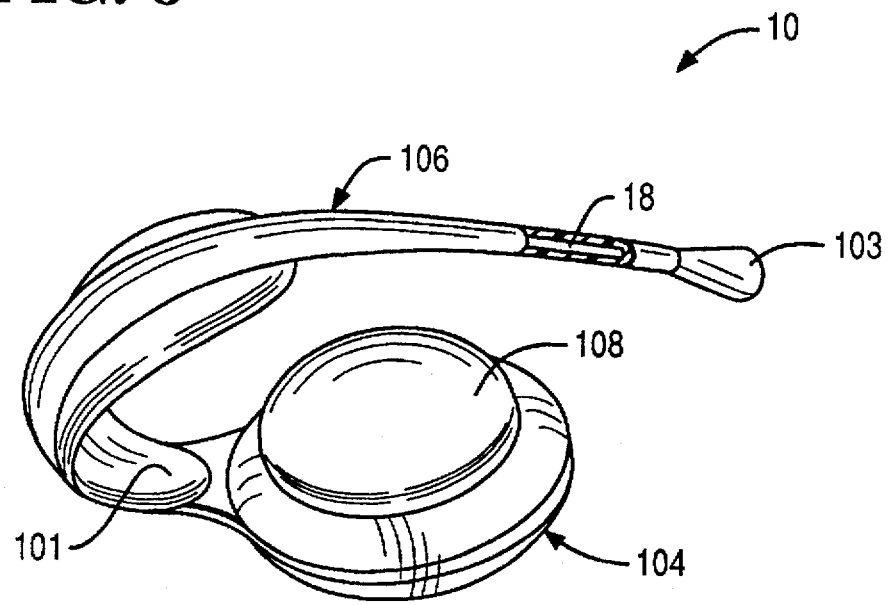
FIG. 6 is a perspective view of a second embodiment of the palm mouse of the present invention.

Referring now to FIG. 6, a perspective view of a second embodiment of palm mouse 10 is shown. This embodiment includes body and antenna portions 104 and 106 which are similar to body and antenna portions 90 and 92 of the first embodiment, except that switch 23 (not shown) is located in body portion 104. Body portion 104 includes an upper half 108, which forms an actuator for switch 23, and which is manipulated by employing the palm of a user's hand to apply a thrusting motion against it.

Referring now to FIG. 7, a perspective view of a third embodiment of palm mouse 10 is shown. This embodiment includes body and antenna portions 110 and 112 which are similar to body and antenna portions 90 and 92 of the first embodiment, except that switch 23 is located in body portion 110. Here, body portion 110 is shown with actuators 114 and 116 on bottom surface 96, on opposite sides of track ball 98, for actuating a pair of switches 23 (not shown). Actuators 114 and 116 are manipulated by the finger tips of a user.

Although the present invention has been described with particular reference to certain preferred embodiments thereof, variations and modifications of the present invention can be effected within the spirit and scope of the following claims.

What is claimed is:

1. A pointing device for a computer having a screen and a keyboard comprising:

a generally ovoid first portion which fits entirely within the palm of a user's hand including a top section having a top surface which is generally ovoid in shape, a bottom section having a bottom surface which is generally flat in shape and which contains an aperture, a pointing signal generator for generating pointing signals including a ball member which protrudes through the aperture, and a control circuit for processing the pointing signal to move a cursor on the screen;

a second portion which wraps around the back of the user's hand and which retains the first portion in the palm including a ring member sandwiched between the top and bottom sections, and a J-shaped flexible member attached to the ring section having an inner surface for cupping the hand and an outer surface; and a switch for activating a predetermined function on the screen of the computer by producing signals which are processed by the pointing signal generator.

2. The pointing device as recited in claim 1 further comprising:

a wireless communication circuit for wirelessly communicating with the computer.

3. The pointing device as recited in claim 1, wherein the switch is on the bottom surface.

4. The pointing device as recited in claim 1, wherein the switch is on the top surface and has a generally ovoid shape.

5. The pointing device as recited in claim 1, wherein the switch is on the outer surface of the J-shaped flexible member.

6. The pointing device as recited in claim 1, further comprising:

a saddle attached to the inner surface of the J-shaped flexible member.

7. The pointing device as recited in claim 1, wherein the second portion further comprises:

a ring member sandwiched between the top and bottom sections;

wherein the J-shaped flexible member is attached to the ring member; and an antenna within the J-shaped member.

8. The pointing device as recited in claim 2, wherein the wireless communication circuit comprises:

a transmitter within the first portion for communicating with a receiver coupled to the computer.

9. A pointing device for a computer having a screen and a keyboard comprising:

a first portion which fits entirely within the palm of a user's hand including a ball member for generating pointing signals, a control circuit for processing the pointing signals to move a cursor on the screen, a top section having a top surface which is generally ovoid in shape, a bottom section having a bottom surface which is generally flat in shape and which contains an aperture through which the ball member protrudes;

a second portion which wraps around the back of the user's hand and which retains the first portion in the palm, including a ring member sandwiched between the top and bottom sections, a J-shaped flexible member attached to the ring member having an inner surface for cupping the hand and an outer surface, a switch on the outer surface of the J-shaped flexible member for activating a predetermined function on the screen of the computer, and a processing circuit within the control circuit for processing signals from the switch; and a wireless communication circuit for wirelessly communicating with the computer including a transmitter within the first portion, a first antenna within the J-shaped member and coupled to the transmitter, a power supply within the first portion, a receiver coupled to the computer, and a second antenna coupled to the receiver.

10. A pointing device for a computer having a screen and a keyboard comprising:

a generally ovoid first portion which fits entirely within the palm of a user's hand including a top section having a top surface which is generally ovoid in shape, a bottom section having a bottom surface which is generally flat in shape and which contains an aperture, a pointing signal generator including a ball member which protrudes through the aperture for generating pointing signals, a control circuit for processing the pointing signals to move a cursor on the screen including a wireless communication circuit for wirelessly communicating with the computer, and a power supply for the control circuit and the pointing signal generator;

a second portion which wraps around the back of the user's hand and which retains the first portion in the palm including a ring member sandwiched between the top and bottom sections, a J-shaped flexible member attached to the ring section having an inner surface for cupping the hand and an outer surface, and an antenna within the J-shaped member; and a switch for activating a predetermined function on the screen of the computer by producing signals which are processed by the pointing signal generator.

11. The pointing device as recited in claim 10, wherein the switch is on the bottom surface.

12. The pointing device as recited in claim 10, wherein the switch is on the top surface and has a generally ovoid shape.

13. The pointing device as recited in claim 10, wherein the switch is on the outer surface of the J-shaped flexible member.

14. The pointing device as recited in claim 10, further comprising:

a saddle attached to the inner surface of the J-shaped flexible member.

15. The pointing device as recited in claim 10, wherein the wireless communication circuit comprises:

a transmitter within the first portion for communicating with a receiver coupled to the computer.

16. A pointing device for a computer having a screen and a keyboard comprising:

a generally ovoid first portion which fits entirely within the palm of a user's hand including a top section having a top surface which is generally ovoid in shape, a bottom section having a bottom surface which is generally flat in shape and which contains an aperture, a pointing signal generator for generating pointing signals including a ball member which protrudes through the aperture, and a control circuit for processing the pointing signal to move a cursor on the screen; and a second portion which wraps around the back of the user's hand and which retains the first portion in the palm including a ring member sandwiched between the top and bottom sections, a J-shaped flexible member attached to the ring section having an inner surface for cupping the hand and an outer surface, and a switch on the outer surface of the J-shaped flexible member for activating a predetermined function on the screen of the computer by producing signals which are processed by the pointing signal generator.

* * * * *